(12) United States Patent
Suda

(10) Patent No.: US 7,062,153 B2
(45) Date of Patent: Jun. 13, 2006

(54) REPRODUCING APPARATUS WITH SUB-PICTURE PROCESSING FUNCTION

(75) Inventor: Hajime Suda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1360 days.

(21) Appl. No.: 09/813,851

(22) Filed: Mar. 22, 2001

(65) Prior Publication Data

US 2002/0034375 A1  Mar. 21, 2002

(30) Foreign Application Priority Data

Sep. 19, 2000  (JP)  ............................. 2000-283382

(51) Int. Cl.
*H04N 5/91* (2006.01)

(52) U.S. Cl. ........................................ 386/95; 386/125

(58) Field of Classification Search .................... 386/1, 386/27, 33, 45, 95, 106, 109, 111, 112; 348/384.1, 348/565, 588, 589, 564, 521; 369/32.01, 369/47.1, 275.3; 360/32
See application file for complete search history.

(56) References Cited

U.S. PATENT DOCUMENTS

| 5,721,720 | A | | 2/1998 | Kikuchi et al. |
| 5,758,007 | A | | 5/1998 | Kitamura et al. |
| 5,818,541 | A | * | 10/1998 | Matsuura et al. ............ 348/565 |
| 6,266,478 | B1 | * | 7/2001 | Yoshio et al. ................ 386/125 |
| 6,346,971 | B1 | * | 2/2002 | Numata ....................... 348/565 |
| 6,393,202 | B1 | * | 5/2002 | Yamauchi et al. ............. 386/95 |
| 6,556,252 | B1 | * | 4/2003 | Kim ............................ 348/565 |

* cited by examiner

*Primary Examiner*—James Groody
*Assistant Examiner*—Christopher Onuaku
(74) *Attorney, Agent, or Firm*—Pillsbury Winthrop Shaw Pittman, LLP

(57) ABSTRACT

This invention enables the user to change the display state of the sub-picture signal on the reproducing apparatus side arbitrarily and obtain the display state of the sub-picture signal according to the user's taste. A main picture decoder decodes the compressed main picture data and outputs the main picture signal. A sub-picture decoder decodes the sub-picture data. A sub-picture processing section receives the sub-picture signal decoded the sub-picture decoder and can change the layout position and/or size of the sub-picture signal. A combining section combines the processed sub-picture signal outputted from the sub-picture processing section with the main picture signal and outputs the resulting signal.

11 Claims, 14 Drawing Sheets

ORIGIN y1
y2
x1  x2

ENLARGEMENT OF SUBTITLE DATA

FIG. 9A

LINEx
LINEx+1
LINEx+2

FIG. 9B

⇩ ENLARGEMENT

LINEx
*LINEx
LINEx+1
*LINEx+1
LINEx+2
*LINEx+2

FIG. 9C

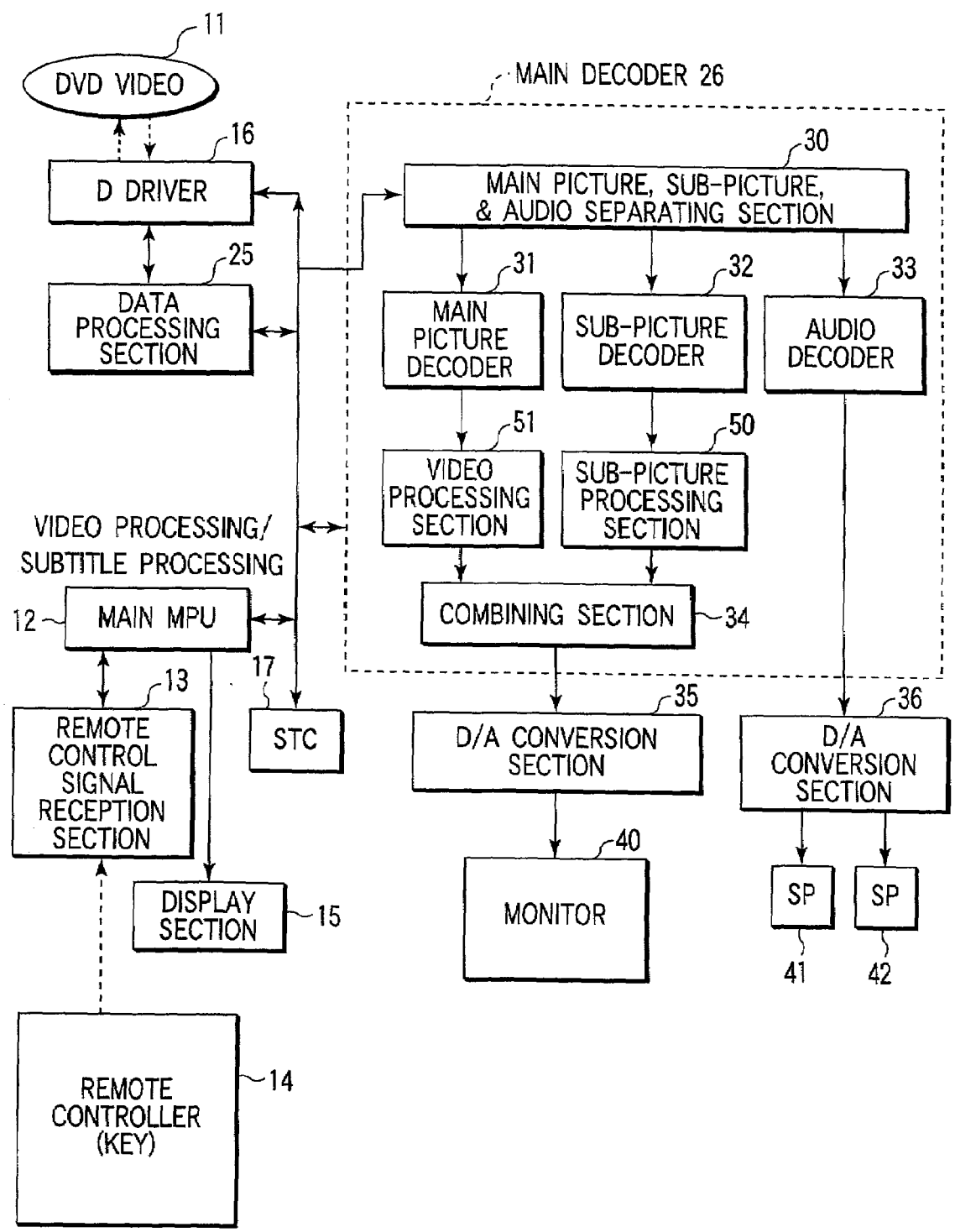
F I G. 10

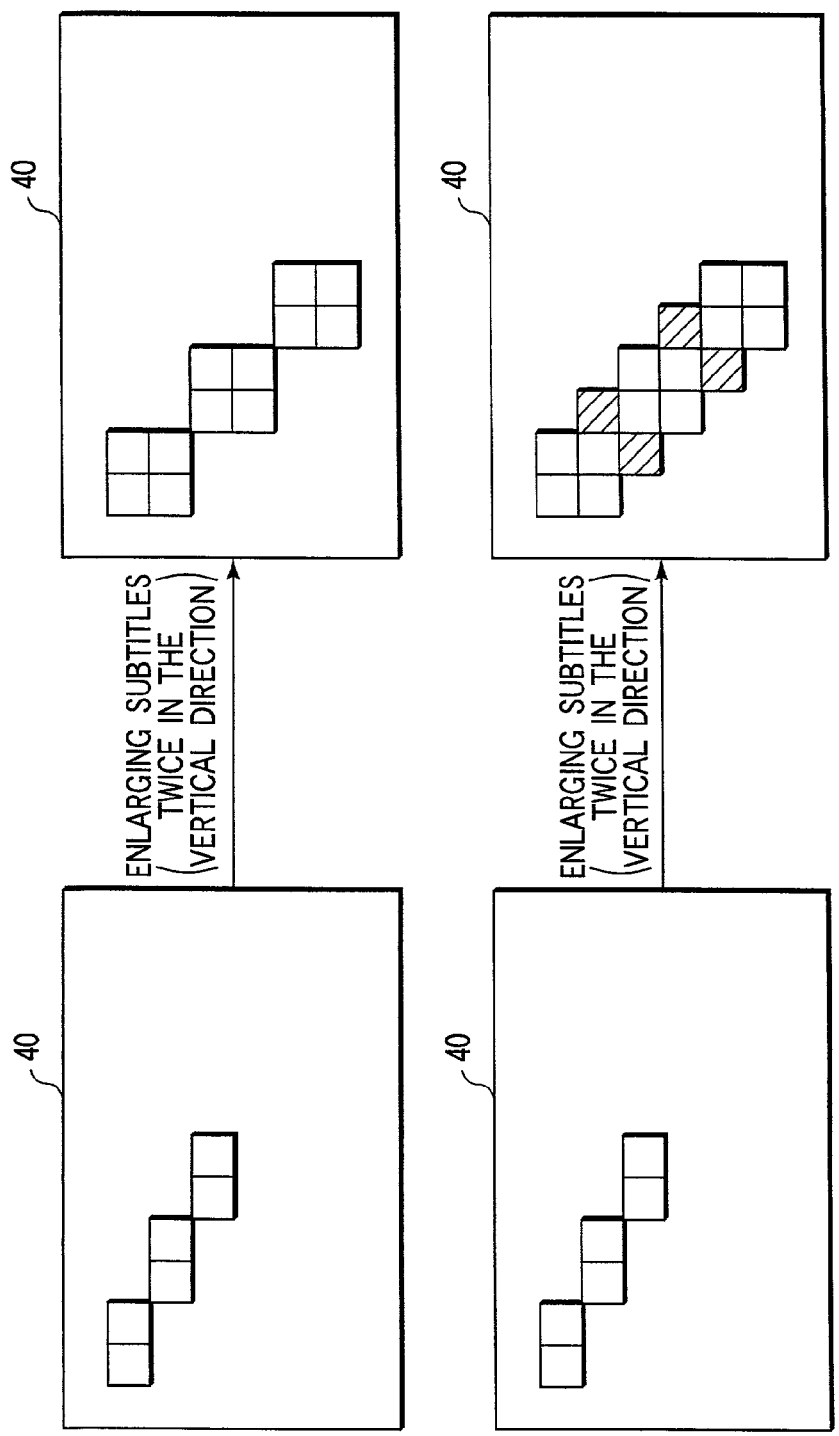

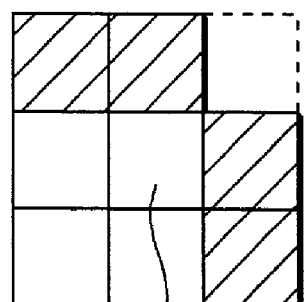
F I G. 14A  INTERPOLATION
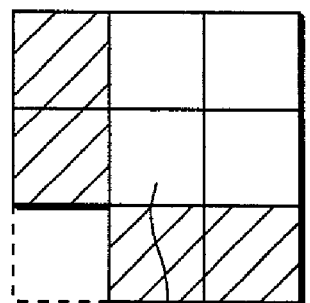
F I G. 14B  INTERPOLATION
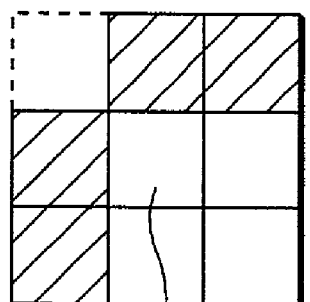
F I G. 14C  INTERPOLATION
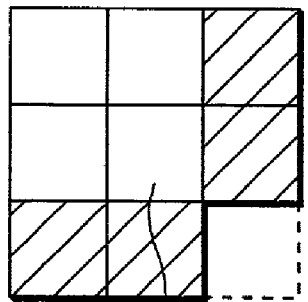
F I G. 14D  INTERPOLATION

REPRODUCING APPARATUS WITH SUB-PICTURE PROCESSING FUNCTION

CROSS-REFERENCE TO RELATED APPLICATIONS

This application is based upon and claims the benefit of priority from the prior Japanese Patent Application No. 2000-283382, filed Sep. 19, 2000, the entire contents of which are incorporated herein by reference.

BACKGROUND OF THE INVENTION

This invention relates to a reproducing apparatus with a sub-picture processing function useful in applying to, for example, a DVD (digital versatile disk) video reproducing apparatus.

In techniques related to DVD video systems, video data and management information necessary to reproduce the video data are recorded on an optical disk. A DVD reproducing apparatus reads management data and controls the reproducing position of video data or sets the signal processing mode of a decoder or the like according to the attributes of the video data.

Video data includes main picture data obtained by compressing picture signals by the MPEG (Moving Pictures Experts Group) scheme, audio data obtained by PCM (pulse code modulation) processing audio signals or processing audio signals by the AC-3 system, and further sub-picture data obtained by run-length compressing signals of subtitles or the like. The main picture data, audio data, and sub-picture data are packed and recorded in the form of video packs, audio packs, and sub-picture packs. These packs are put together to form a video object unit (VOBU) to make it convenient to specify a playback range or a playback sequence. Moreover, a management unit called a video object (VOB), a collection of a plurality of VOBUS, is set to make it convenient to select or specify a playback chapter.

Management information includes VOB information to specify the VOB and program chain (PGC) information to determine the order in which a plurality of VOBUs included in the VOB are reproduced. The program chain (PGC) information has cell (Cell) information that specifies one or more VOBUs. Actually, the PGC specifies the order of the Cell. Then, the Cell information has entry information about the VOBUs.

Furthermore, the management information includes information about conditions necessary to decode the sub-picture data. The condition information is actually included in a sub-picture pack. The sub-picture signal has to be displayed in synchronization with the main-picture signal. For this reason, it includes display timing information (or information about the display position and display area on the screen) with respect to the main picture data, display period information, contrast information, and display color information.

As described above, in the DVD system, the display position and display color of the sub-picture signal with respect to the main picture signal have been determined. Thus, the magnitude, color, display position, and the like of the sub-picture signal (subtitles) are realized in the state set by the DVD video producer.

Depending on the users, however, it is desirable that the sub-picture signal (subtitles) should be smaller or larger. Moreover, they may make various requests, such as watermarked display or the change of the display position.

BRIEF SUMMARY OF THE INVENTION

It is, accordingly, an object of the present invention is to provide a reproducing apparatus with a sub-picture processing function which enables the user to change the display state of the sub-picture signal on the reproducing apparatus side and obtain the display state of the sub-picture signal according to the user's taste.

The foregoing object is accomplished by providing a reproducing apparatus with a sub-picture processing function, comprising: a main picture decoder for decoding compressed main picture data and outputting a main picture signal; a sub-picture decoder for decoding sub-picture data; sub-picture processing means for receiving the sub-picture signal decoded at the sub-picture decoder and changing the layout position and/or size of the sub-picture signal; and combining means for combining the processed sub-picture signal outputted from the sub-picture processing means with the main picture signal.

In the reproducing apparatus of the present invention, the sub-picture processing means includes display area position judging means for judging the position of the display area of the inputted sub-picture signal with respect to a main picture frame, and position changing means for the position of the display area with respect to the main picture frame.

Furthermore, in the reproducing apparatus, the sub-picture processing means includes means for judging the size of the display of the inputted sub-picture signal with respect to a main picture frame, and means for changing the size of the display on the basis of the result of judgment made by the size judging means.

In addition, in the reproducing apparatus, the sub-picture processing means has the function of changing the display color of the inputted sub-picture signal.

Moreover, in the reproducing apparatus, the sub-picture processing section has display color changing means for changing the display color according to the display position of the inputted sub-picture signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 9A to 9C are explanatory diagrams showing an example of enlarging subtitles in the apparatus of the present invention;

FIG. 10 is a block diagram of another embodiment of an apparatus according to the present invention;

FIGS. 13A and 13B are diagrams to help explain the principle of smoothing when the apparatus of the present invention starts the smoothing function;

FIGS. 14A to 14D are explanatory diagrams showing an example of the positions of interpolated data items during the operation of the smoothing function;

DETAILED DESCRIPTION OF THE INVENTION

Hereinafter, referring to the accompanying drawings, embodiments of the present invention will be explained.

Figure 1:
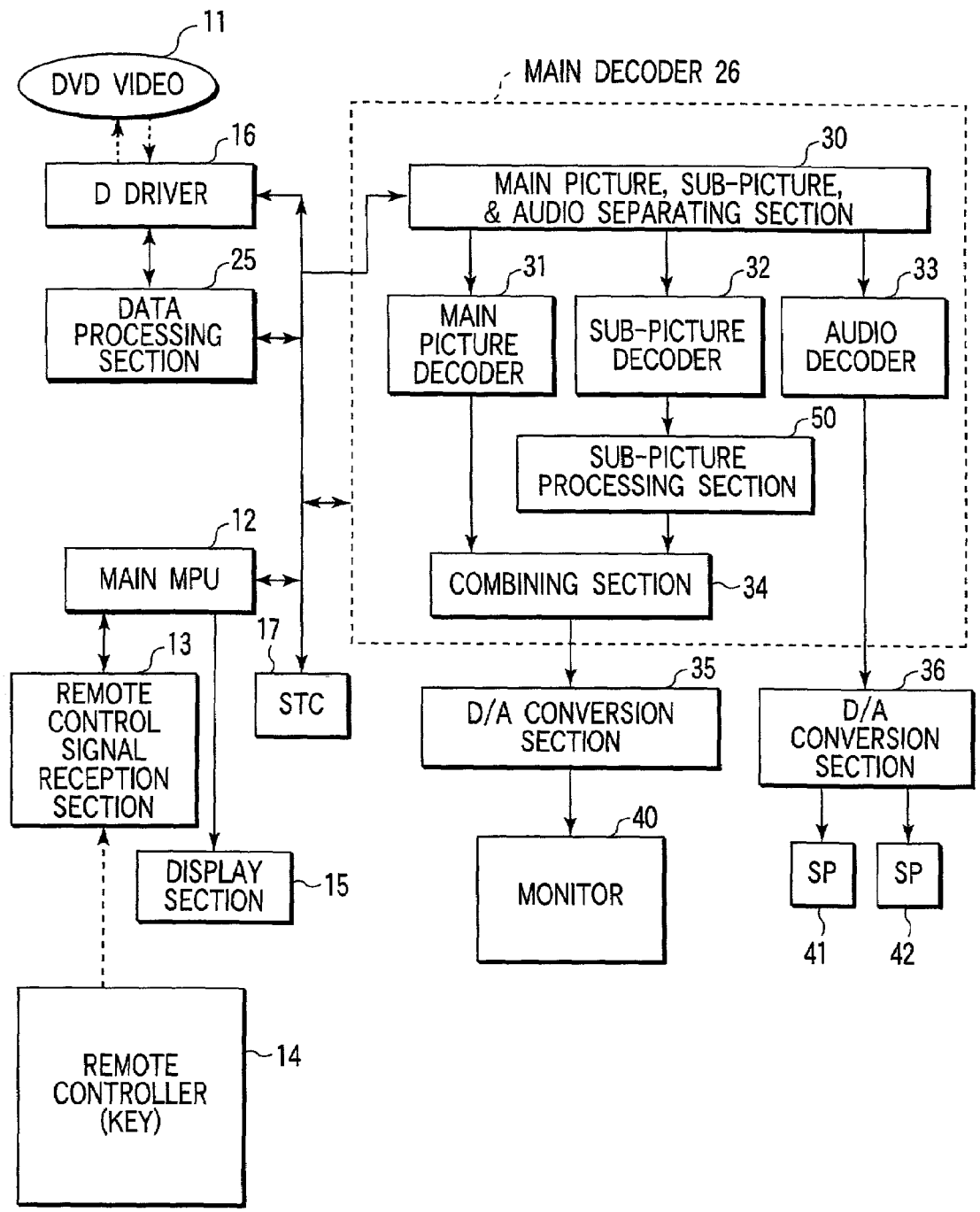
FIG. 1 shows an embodiment of a reproducing apparatus with a sub-picture processing function according to the present invention.

FIG. 1 shows a DVD video reproducing apparatus according to an embodiment of the present invention.

The control of the reproducing apparatus is supervised by a main microprocessor unit (main MPU) 12. In this case, the main MPU 12 not only receives the request of the user operating a remote controller 14 via a remote control signal receiving section 13 and controls the reproducing apparatus but also displays the signal of the result of the control on a display section 15.

A DVD video (or an optical disk) 11 is controlled by a disk driver 16 driven under the control of the main MPU 12. The disk driver 16 has the function of rotating the optical disk 11 at a specific rotational speed by means of a disk motor (not shown) and its rotary servo circuit and the function of reading the data from the optical disk 11 by means of an optical head (not shown) and its servo circuit.

At the time of playback start, the main MPU 12 resets an STC (system time counter) 17, a timer for measuring a reference time in carrying out a reproduce operation.

The operation of reproducing the data from the optical disk 11 will be explained.

When receiving the playback instruction from the remote controller 14, the main MPU 12 reads the data in the management area on the optical disk 11 via the disk driver 16 and a data processing section 25 and determines a read address for reproducing the data.

Thereafter, the main MPU 12 outputs the determined address and read instruction to the disk driver 16. Then, the disk driver 16 reads the sector data from the optical disk 11 on the basis of the inputted read instruction and outputs the data to the data processing section 25.

In this case, the data processing section 25 subjects the inputted sector data to a demodulation process (16-8 conversion) and error correction process and converts the resulting signal into pack data. The pack data is inputted to a main picture, sub-picture, and audio separating section 30. The separating section 30 separates the inputted pack data into main picture packet data, sub-picture packet data, and audio packet data.

The separated main picture packet data, sub-picture packet data, and audio packet data are supplied to a main picture decoder 31, a sub-picture decoder 32, and an audio decoder 33 respectively. In this case, a navigation pack is stored in the built-in memory (not shown) of the separating section 30 for subsequent processing by the main MPU 12 and is ready to be accessed by the main MPU 12.

When the individual packet data separated at the separating section 30 are transferred to the decoders 31, 32, and 33 respectively, a PTS (presentation time stamp) is loaded into the STC 17. The loading process is realized when, for example, the main MPU 12 loads the PTS in the navigation pack into the STC 17 or when the main picture decoder 31 loads the PTS of the picture data automatically into the STC 17.

The navigation pack is placed at the head of a video object unit (VOBU) and is referred to when special playback (such as high-speed normal or reverse playback, or angle change). The navigation pack is a kind of management information including address information about the VOBUs in front of and behind the VOBU currently being reproduced and interleave unit information.

Each of the decoders 31, 32, 33 compares the value of the PTS in the packet data it is processing with the measured value of the STC 117. That is, each of the decoders 31, 32, 33 reproduces the packet data in synchronization with the value of the PTS.

The main picture data and sub-picture data reproduced at the main picture decoder 31 and sub-picture decoder 32 are supplied to a combining section 34, which combines the main picture data and sub-picture data. Thereafter, the combined picture data is converted by a D/A (digital-to-analog) conversion section 35 into analog data. The audio data reproduced at the audio decoder 33 is converted by a D/A conversion section 36 into analog data. Then, the output of each of the D/A conversion sections 35, 36 is supplied to the outside world via an A/V output section.

The output of the D/A conversion section 35 is supplied to a monitor 40 and the output of the D/A conversion section 36 is supplied to speakers (SPs) 41, 42.

The apparatus of the present invention is characterized by comprising a sub-picture processing section 50 which enables the user to process the sub-picture signal outputted from the sub-picture decoder 32.

Hereinafter, the signal processing function including the sub-picture processing section 50 and its operation will be explained.

Explanation will be given about the operation and function in a case where the contents of movies and karaoke have been recorded on a DVD video, a case where their subtitles are to be enlarged, or a case where the subtitles are to be moved.

Figure 2:
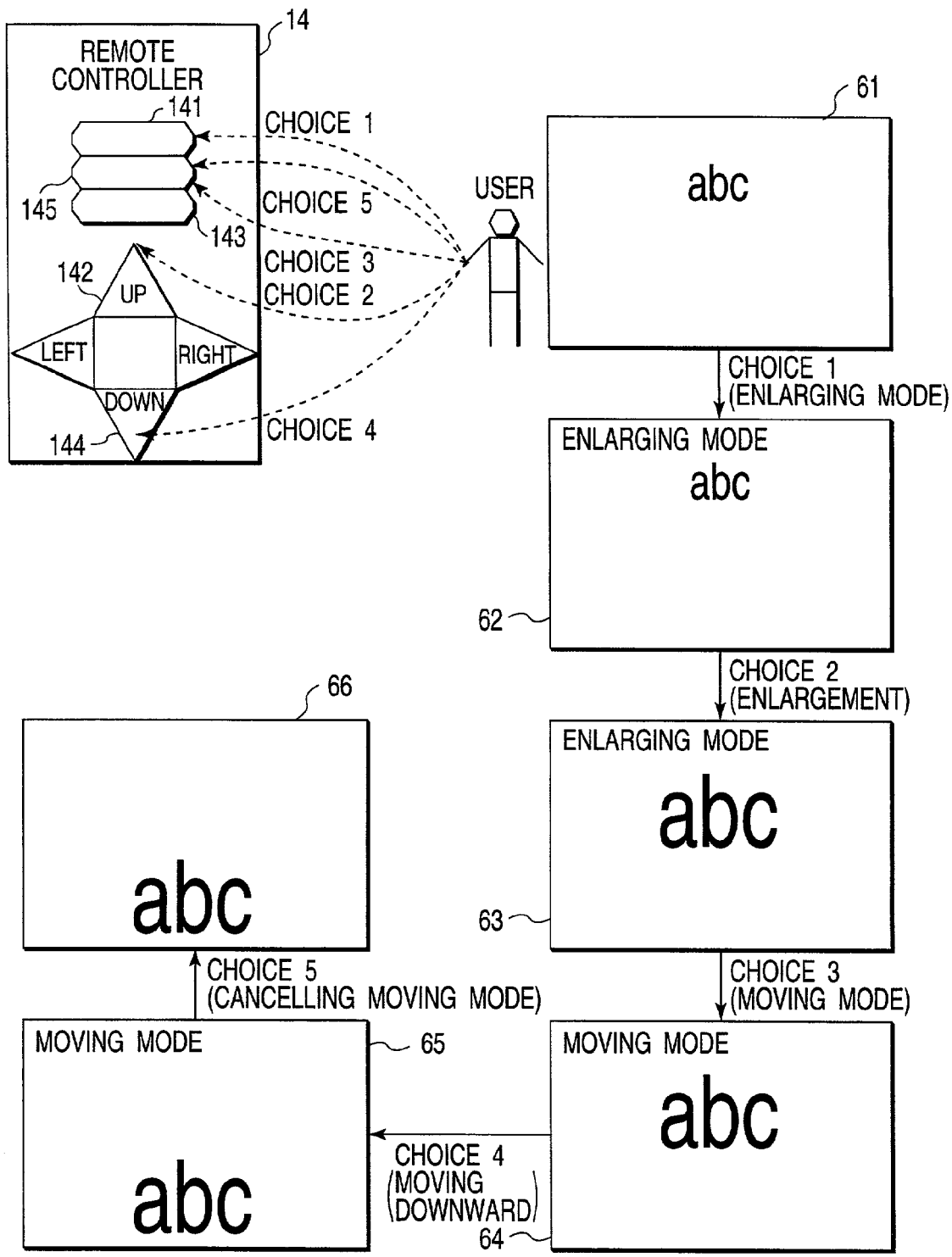
FIG. 2 illustrates the operation of the apparatus related to the present invention, showing how to operate the apparatus and how the monitor screen is converted.

FIG. 2 shows the control keys of the remote controller 14 necessary for the above operations, the order in which the user operates the keys, and the way the subtitles on the monitor change.

When the user carries out operations related to enlargement, reduction, or movement and the enlarged, reduced, or moved subtitles are displayed, the flow of the entire system is as follows.

The user operates the remote controller 14 to effect enlargement, reduction, or movement of the subtitles. The remote control signal reception section 13 recognizes the contents of the user's operation transmitted from the remote controller 14. The remote control signal reception section 13 transfers the remote control key data to the main MPU 12. Recognizing the received remote control key data and controls the main decoder 26 to effect the enlargement, reduction, or movement of the subtitles requested by the user. On the basis of the main MPU control data, the main decoder 26 controls the sub-picture processing section 50, which effects the enlargement, reduction, or movement of the subtitles.

Next, an example of the output state on the monitor corresponding to operation by the user will be described by reference to FIG. 2. The order in which the user operates the remote controller 14 to effect the enlargement or movement of the subtitles will be explained.

Choice 1: The user presses a process enter button 141 on the remote controller 14 to tell the reproducing apparatus that it is going to enter the subtitle enlarging mode (screen 61). At this time, to inform the user that the subtitle enlarging mode is on, the reproducing apparatus displays a character string, such as "ENLARGING MODE," or the corresponding symbol on the monitor (screen 62).

Choice 2: The user presses an enlarging button 142, thereby causing enlarged subtitles to appear (screen 63).

Choice 3: The user presses a mode switching button 143 to move the subtitles. At this time, to inform the user that the subtitle moving mode is on, the reproducing apparatus displays a character string, such as "MOVING MODE," or the corresponding symbol on the monitor (screen 64).

Choice 4: The user presses a moving button 144, thereby causing the subtitles to move (screen 65).

Choice 5: The user presses a process output button 145, thereby causing the apparatus to exit from the enlarging mode, the subtitle processing mode, or the moving mode (screen 66).

FIG. 2 is a mode transition diagram to help explain the relationship between the controlled states of the main decoder 26.

The main MPU 12 has to judges whether the present state is in the enlarging/reducing mode, the moving mode, or the normal mode in which subtitles will not be processed, and give a suitable instruction to the main decoder 26.

Figure 3:
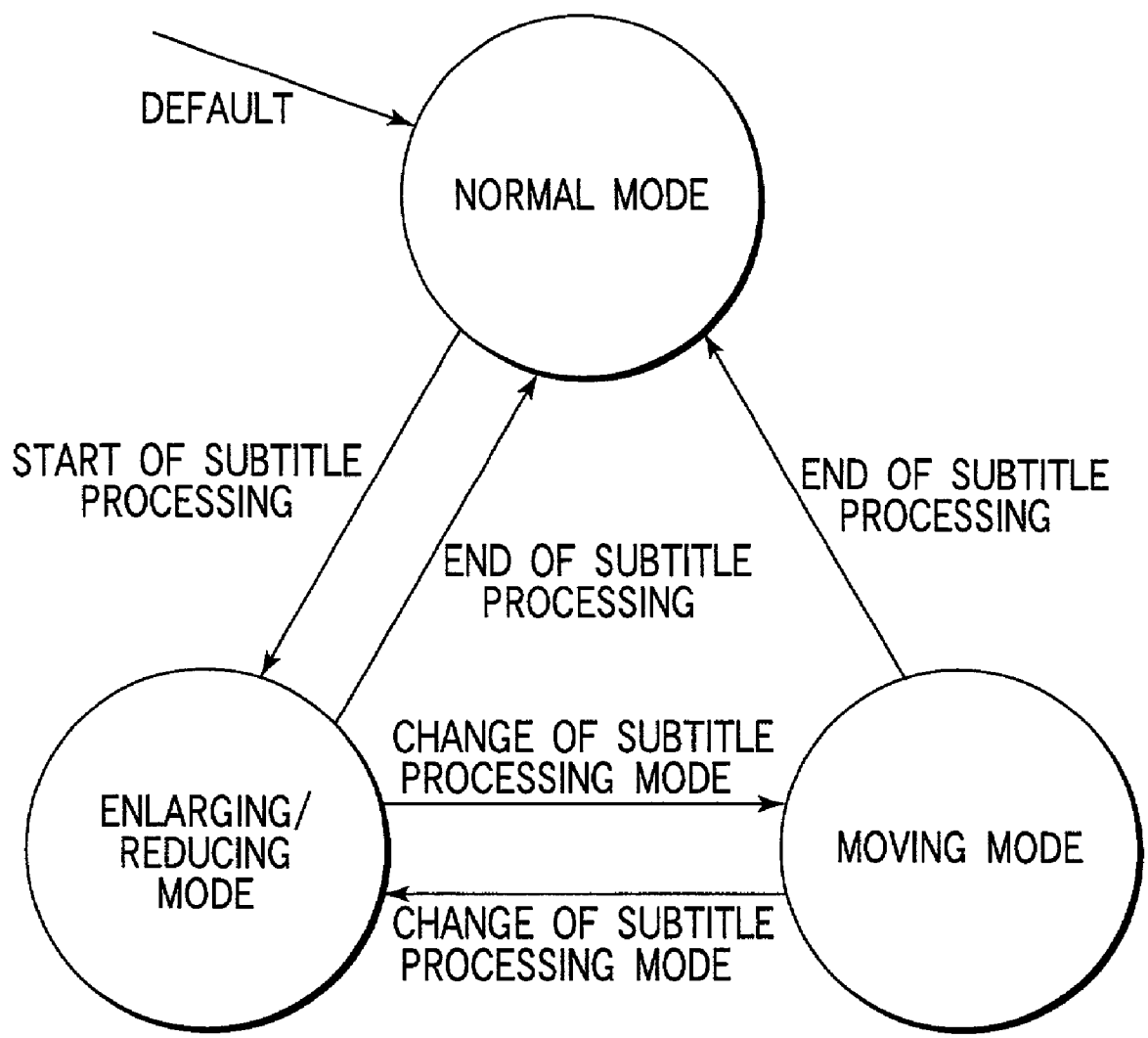
FIG. 3 is a diagram to help explain an example of the way the operation changes from one mode to another in the apparatus of the present invention.

As shown in FIG. 3, the modes include the normal mode, enlarging/reducing mode, and moving mode and are decided as follows. Only in the enlarging/reducing mode and the moving mode, subtitles are processed. In the normal mode, they are not be processed. The default mode is the normal mode.

(a) When the contents of the user's request (the transmission from the remote controller 14) is the start of subtitle processing, the mode changes to either the enlarging/reducing mode or moving mode.

(b) When the contents of the user's request is the end of subtitle processing, the mode changes to the normal mode, even if the present mode is in either the enlarging/reducing mode or moving mode.

(c) When the contents of the user's request is the change of the subtitle processing mode, the present mode will change to the moving mode if it is in the enlarging/reducing mode, whereas the present mode will change to the enlarging/reducing mode if it is in the moving mode.

Figure 4:
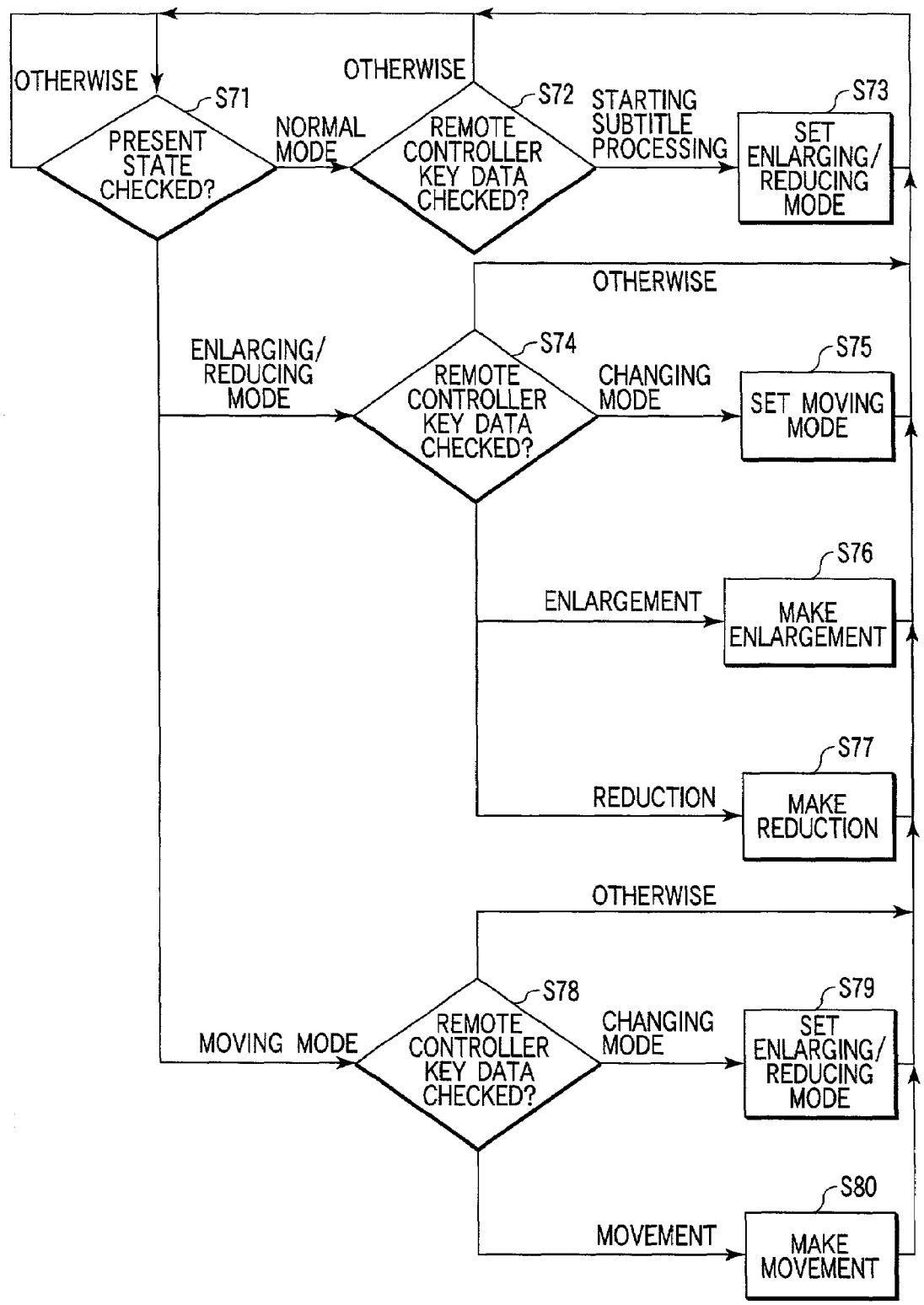
FIG. 4 is a flowchart to help explain an example of the operation of the apparatus related to the present invention.

FIG. 4 is a flowchart for controlling the main decoder 26 of the main MPU to realize the transition of the above states.

The present state is checked and it is judged whether the present state is in the normal mode, enlarging/reducing mode, or moving mode, or another mode (step S71).

If the contents of the transmission from the remote controller 14 are the start of subtitle processing, the main decoder 26 (or sub-picture processing section 50) is set in the enlarging/reducing mode (steps S72, S73). If it has been judged at step S71 that the enlarging/reducing mode is on, the contents of the transmission from the next remote controller 14 are checked (step S74). Here, if the contents indicate the mode change, the main decoder 26 (or sub-picture processing section 50) is set in the moving mode (step S75). If the contents indicate the enlarging mode, the main decoder 26 (or sub-picture processing section 50) is set in the enlarging mode (step S76). If the contents indicate the reducing mode, the main decoder 26 (or sub-picture processing section 50) is set in the reducing mode (step S77).

If at step S71, it has been judged that the moving mode is on, the contents of the transmission from the next remote controller 14 are checked (step S78). Here, if the contents indicate the mode change, the main decoder 26 (or sub-picture processing section 50) is set in the enlarging/reducing mode (step S79). If the contents indicate the moving mode, the main decoder 26 (or sub-picture processing section 50) is set in the moving mode (step S80).

Figure 5:
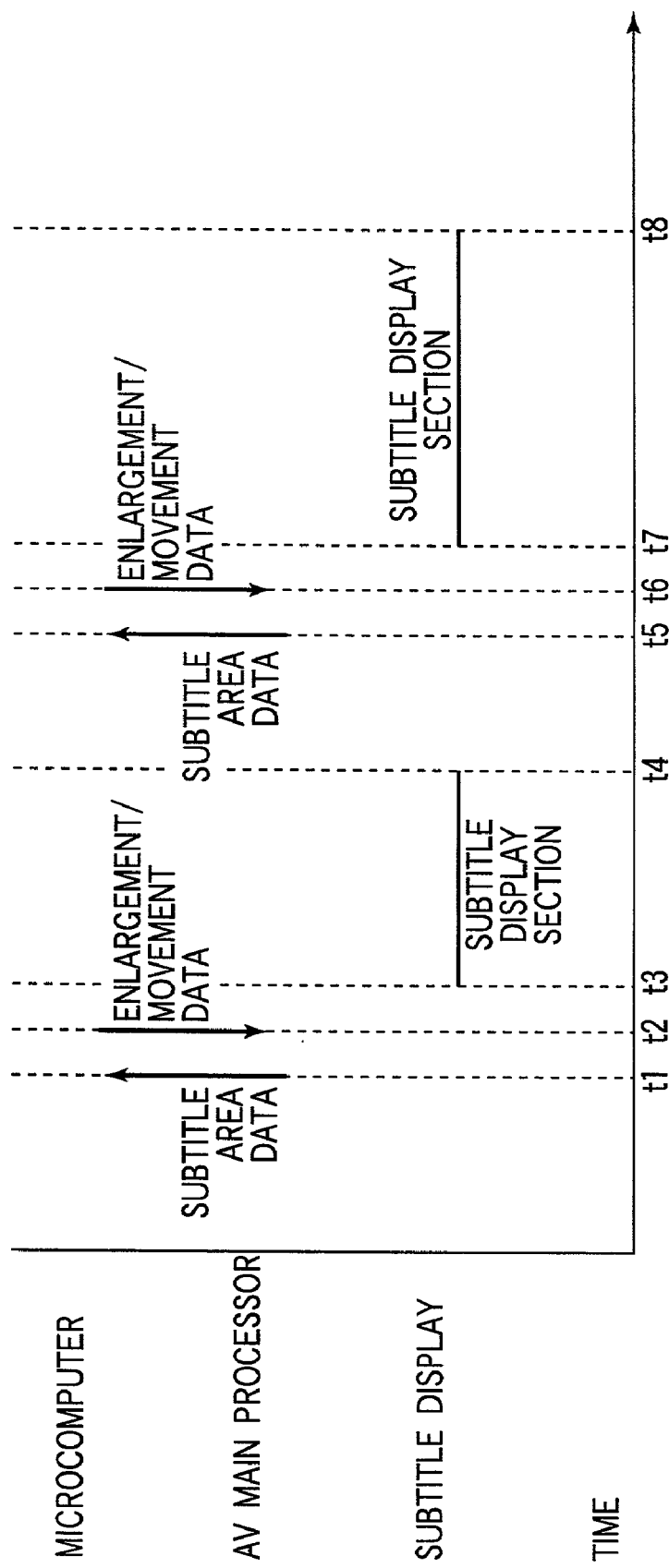
FIG. 5 shows an example of the timing for the operation of the apparatus of the present invention.

FIG. 5 shows the timing with which the main MPU 12 exchanges information with the main decoder 26. At time t1, the main decoder 26 transfers subtitle area data to the main MPU 12. Then, at time t2, the main MPU 12 transfers movement (or enlargement) control data to the main decoder 26. The range from time t3 to time t4 is the subtitle display period of the moved (or enlarged) subtitles. If necessary, the main decoder 26 transfers the subtitle area data to the main MPU 12 at time t5. Then, at time t6, the main MPU 12 transfers the movement (or enlargement) control data to the main decoder 26. Then, the range from time t7 to time t8 is the subtitle display period of the moved (or enlarged) subtitles.

FIG. 6 shows various cases in the direction of the enlargement of the subtitle area.

Figure 6A:
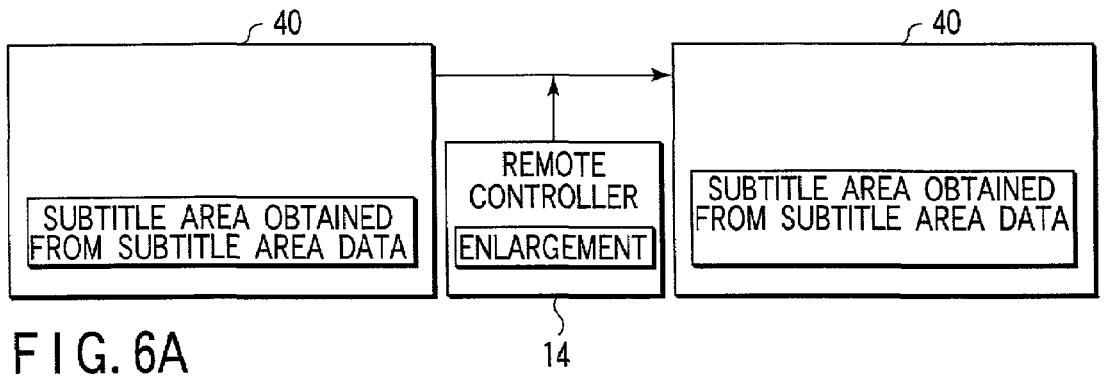
FIGS. 6A to 6D show examples of the representations corresponding to how the apparatus of the present invention is operated.

As shown at left in FIG. 6A, it is assumed that the subtitle area has more length than width and that when it is located in the lower part of the screen, an enlarging instruction is given from the remote controller 14. In this case, an enlargement is made only in the vertical direction and the subtitle area is enlarged upward by an increase in the size in the vertical direction as shown at right in FIG. 6A.

Figure 6B:
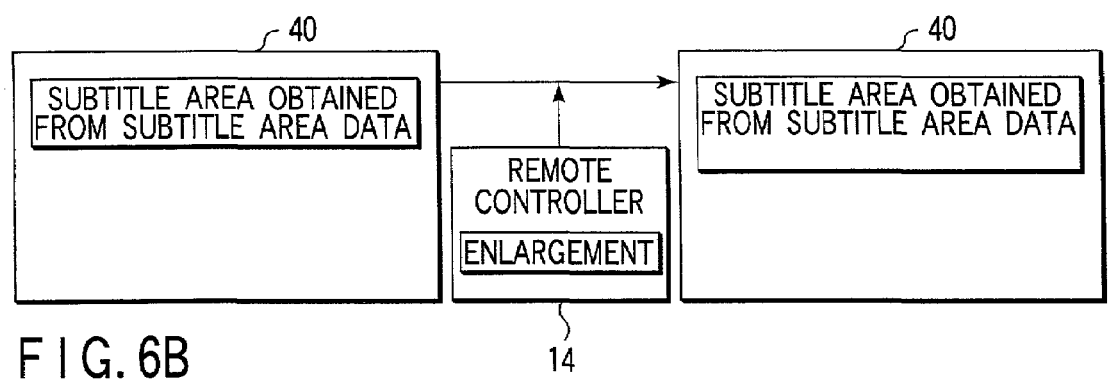

As shown at left in FIG. 6B, it is assumed that the subtitle area has more length than width and that when it is located in the upper part of the screen, an enlarging instruction is given from the remote controller 14. In this case, an enlargement is made only in the vertical direction and the subtitle area is enlarged downward by an increase in the size in the vertical direction as shown at right in FIG. 6B.

Figure 6C:
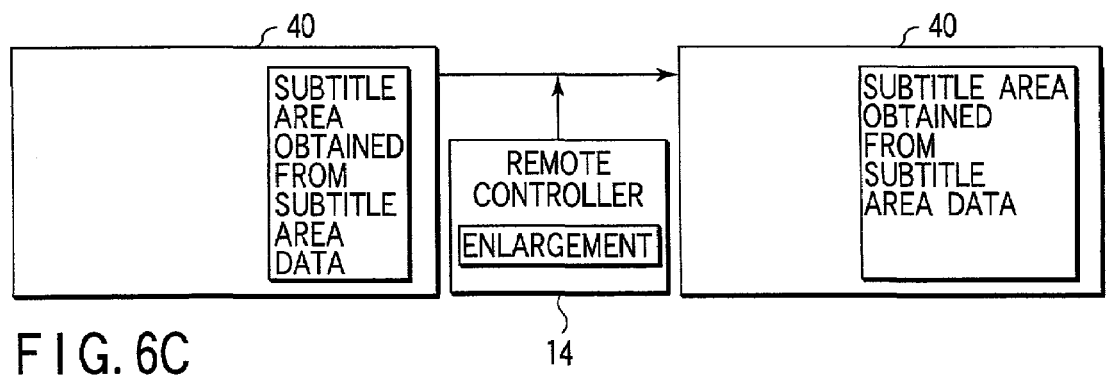

As shown at left in FIG. 6C, it is assumed that the subtitle area has more width than length and that when it is located on the right side of the screen, an enlarging instruction is given from the remote controller 14. In this case, an enlargement is made only in the horizontal direction and the subtitle area is enlarged leftward by an increase in the size in the horizontal direction as shown at right in FIG. 6C.

Figure 6D:
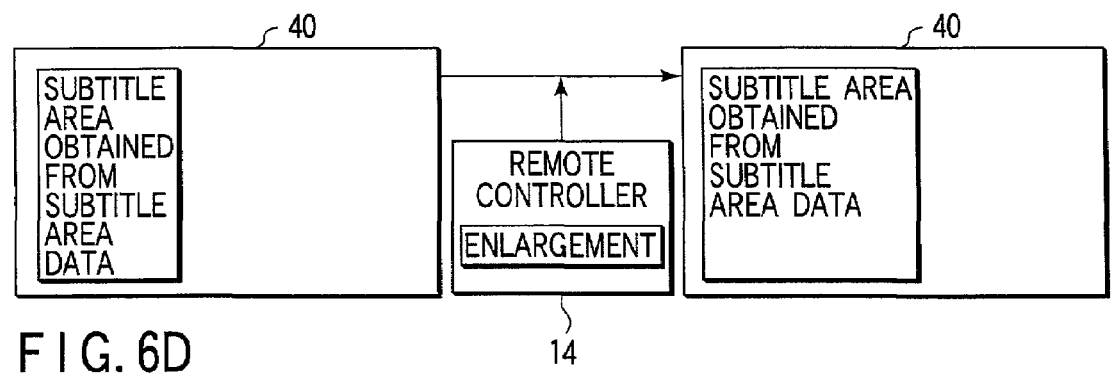

As shown at left in FIG. 6D, it is assumed that the subtitle area has more width than length and that when it is located on the left side of the screen, an enlarging instruction is given from the remote controller 14. In this case, an enlargement is made only in the horizontal direction and the subtitle area is enlarged rightward by an increase in the size in the horizontal direction as shown at right in FIG. 6D.

Figure 7:
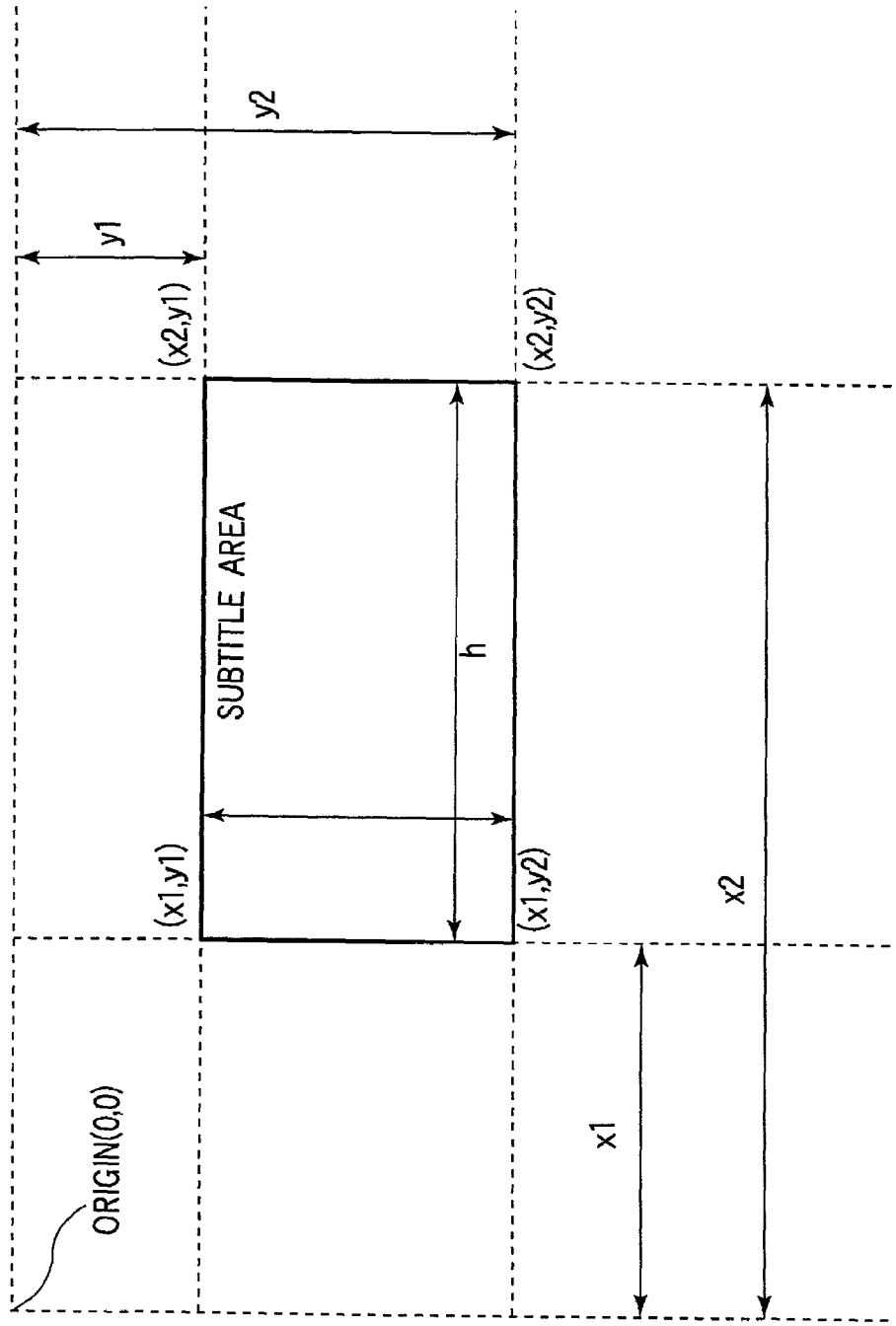
FIG. 7 is a diagram to help explain the idea of a subtitle area address (data) in the apparatus related to the present invention.

FIG. 7 shows the principle on which the main MPU 12 analyzes the subtitle area data.

The sub-picture processing section 50 of the main decoder 26 includes a subtitle area judging section.

The main MPU 12 receives the subtitle area data from the subtitle area judging section as explained in FIG. 5. Then, the main MPU 12 judges whether the subtitle area has more length than width or more width than length. Thereafter, it judges in which part of the screen the subtitle area is located, the upper, lower, right, or left.

As shown in FIG. 7, the subtitle area data represents the coordinate information of x1, x2, y1, y2 with respect to the origin (0, 0) (corresponding to the upper left corner of the effective screen of the monitor). Let the horizontal size of the subtitle area be h, its vertical size be v, the horizontal size of the overall display area (or monitor screen size) be hh, and its vertical size be vv.

(A) In the setting, the algorithm for judging whether the subtitle area has more length than width or more width than length is as follows: (1) h is compared with v; (2) if h is larger than v, it is judged that the area has more length than width; and (3) if v is larger than h, it is judged that the area has more width than length. In this way, a judgment whether the subtitle area has more length than width or more width than length is made.

(B) Next, the algorithm for judging in which part of the monitor screen the subtitle area is located, the upper, lower, right, or left part, is as follows: (1) when the subtitle area has more length than width, it is judged whether it is located in the upper part or lower part, and when the substitute area has more width than length, it is judged whether it is located in the right part ore left part; (2) when the subtitle area has more length than with, if the vertical coordinate (y1) of the left side of the subtitle area is larger than half (vv/2) the vertical screen size, it is judged that it is in the lower part, otherwise, it is judged that it is in the upper part; and (3) when the subtitle area has more width than length, if the horizontal coordinate (x1) of the left side of the subtitle area is larger than half (hh/2) the horizontal screen size, it is judged that it is in the right part, otherwise, it is judged that it is in the left part.

(C) Next, a judgment whether the subtitles can be enlarged is made as follows. The main MPU 12 judges only whether the subtitles can be enlarged, because it has to enlarge the subtitles only when they can be enlarged. Here, let e (e>1) be a magnifying power.

When the subtitles have more length than width, if the vertical size of the enlarged subtitle area is smaller than the vertical screen size, it is judged that enlargement is possible, and if the former is larger than the latter, it is judged that enlargement is impossible. It can be verified by making a judgment whether the expression $v \times e < vv$ holds. When the subtitles have more width than length, if the horizontal size of the enlarged subtitle area is smaller than the horizontal screen size, it is judged that enlargement is possible, and if the former is larger than the latter, it is judged that enlargement is impossible. It can be verified by making a judgment whether the expression $h \times e < hh$ holds.

Figure 8:
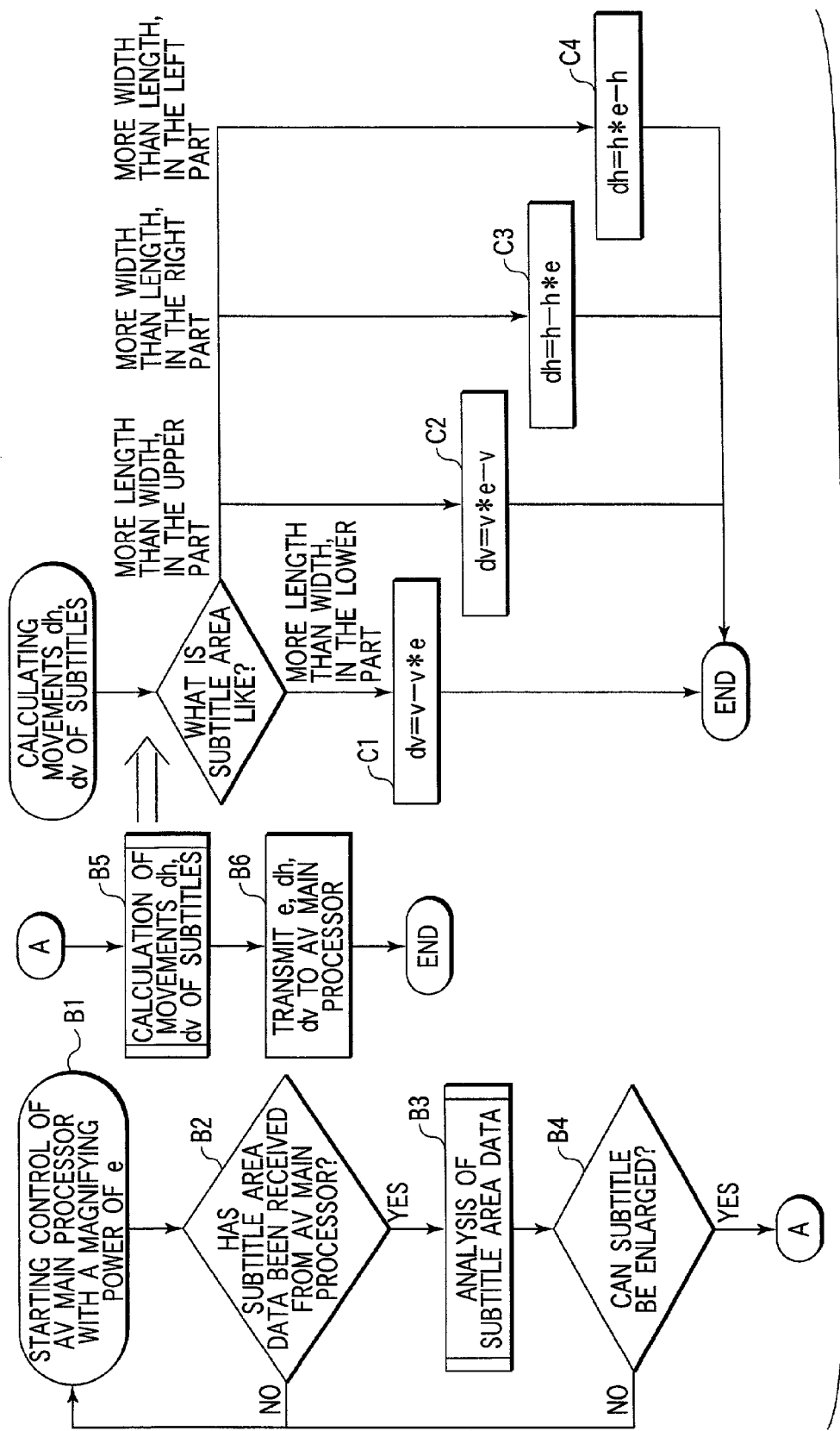
FIG. 8 is a flowchart to help explain an example of data processing in the apparatus of the present invention.

FIG. 8 shows the flow of the operation when the main MPU 12 controls the main decoder 26.

When control of the main decoder 26 is started, the magnifying power e of the subtitle area is set (step B1).

Then, the subtitle area data is received from the main decoder 26 (step B2). Next, an analysis of the subtitle area data is made (step B3). The analysis has been explained earlier. Then, it is judged whether the subtitles can be enlarged (step B4).

If the subtitles can be enlarged, the movements dh, dv of the subtitles are calculated (step B5). After the calculation, the calculated values dh, dv are transmitted to the main decoder 26 (step B6).

The movements of the-subtitles are calculated at step B5 as follows.

When the subtitle area has more length than width and is in the lower part, then $dv=v-v \times e$ (step C1).

When the subtitle area has more length than width and is in the upper part, then $dv=v \times e-v$ (step C2).

When the subtitle area has more width than length and is in the right part, then $dh=h-h \times e$ (step C3).

When the subtitle area has more width than length and is in the left part, then $dh=h \times e-h$ (step C4).

Next, an example of creating subtitle area data (x1, x2, y1, y2) at the main decoder 26 will be explained.

The subtitle data is composed of a 2-bit bit map. When the value of 2 bits is 00b, it indicates background; when the value is 01b, it indicates pattern; and when the value is 10b or 11b, it indicates emphasis. Then, x1, x2, y1, and y2 are calculated according to the following procedure and set as the subtitle area data:

(1) Let the first position of 01b, 10b, 11b to appear in the horizontal direction be x1.

(2) Let the last position of 01b, 10b, 11b to appear in the horizontal direction be x2.

(3) Let the first position of 01b, 10b, 11b to appear in the vertical direction be y1.

(4) Let the last position of 01b, 10b, 11b to appear in the vertical direction be y2.

Next, the operation of enlarging the subtitle data at the main decoder 26 will be explained.

FIGS. 9A to 9C show the subtitle area and the way the data changes when the subtitle area is enlarged. Specifically, FIG. 9A shows the whole of the bit map data including the subtitle area. FIG. 9B shows part of the subtitle area. FIG. 9C shows an enlarged example of the data in FIG. 9B. The lines marked with * are added lines. In this example, the subtitle area is enlarged twice in the horizontal direction. One line is added to each line by copying the data of each line. The adding process is carried out using the buffer memory and memory control section of the sub-picture processing section 50.

The present invention is not limited to the above embodiment.

As shown in FIG. 10, the main MPU 12 may set the video processing/subtitle processing synchronizing mode in the main decoder 12.

Specifically, the output of the main picture decoder 31 is supplied to the video processing section 51, which supplies the output to the combining section 34. The main MPU 12 sets the main decoder 26 in the video processing/subtitle processing synchronizing mode.

Figure 11:
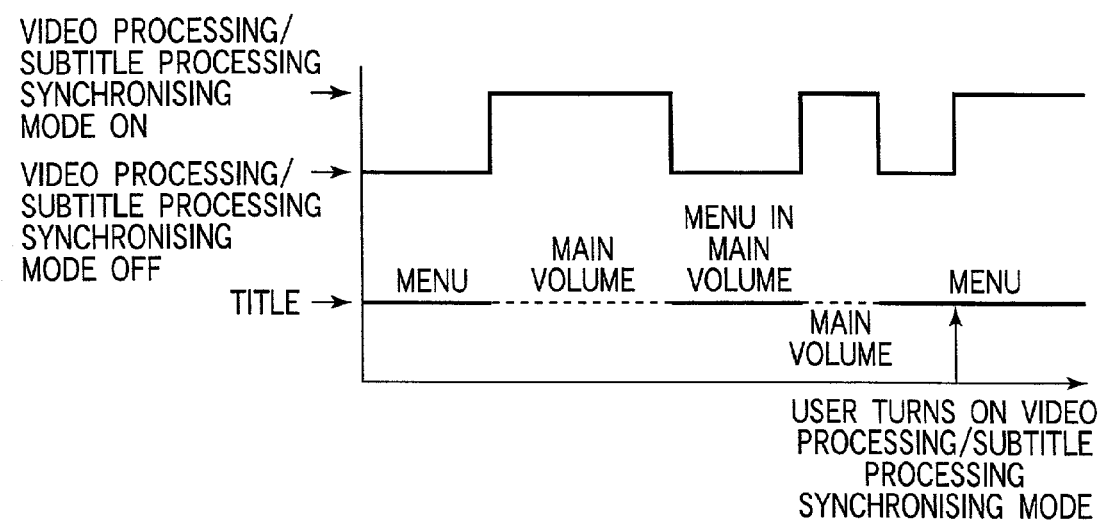
FIG. 11 is a diagram to help explain the operation in the video processing/subtitle processing synchronizing mode in the apparatus of FIG. 10.

FIG. 11 shows an example of the transition of the video processing/subtitle processing synchronizing mode.

Specifically, the video processing/subtitle processing synchronizing mode is turned on or off as follows:

(1) When the menu display comes on, the video processing/subtitle processing synchronizing mode is automatically turned off (because the subtitles work as highlights at this time).

(2) When the menu display for the present volume comes on, the video processing/subtitle processing synchronizing mode is automatically turned off (because the subtitles work as highlights at this time).

(3) When the user turns on the video processing/subtitle processing synchronizing mode, processing is forced to be allowed.

Figure 12:
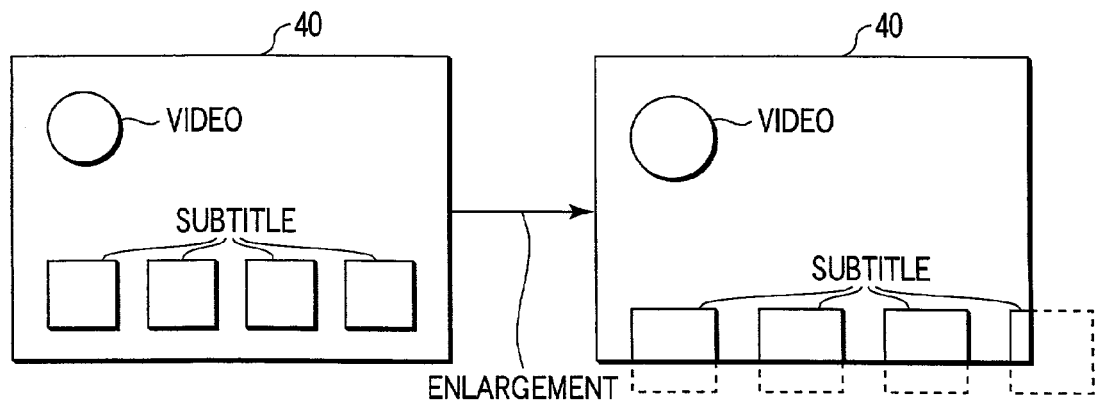
FIG. 12 shows an example of the display when the apparatus of FIG. 10 operates in the video processing/subtitle processing synchronizing mode.

FIG. 12 shows an example of a monitor screen before enlargement and an example of a monitor screen after enlargement, when the video processing/subtitle processing synchronizing mode is on. When the video processing/subtitle processing synchronizing mode is on, the magnifying power of video is the same as that of the subtitles.

The present invention is not limited to the above embodiment. While in the embodiment, the video processing/subtitle processing synchronizing mode can be turned on and off, the smoothing mode may be set in the main decoder 26 via the remote controller 14 and main MPU 12.

At this time, the execution of the smoothing mode prevents the edges of the subtitles from becoming serrate when the subtitles are enlarged.

FIGS. 13A and 13B shows part of the subtitles vertically enlarged twice the size of those before enlargement on the monitor. Each small square block in the figure represents a pixel. FIG. 13A shows a case where the smoothing mode has not been set. FIG. 13B shows a case where the smoothing mode has been set. The shaded parts in FIG. 13B represent the pixels interpolated for smoothing.

There are various methods of determining the interpolating positions of pixels. For example, there are case patterns as shown in FIGS. 14A, 14B, 14C, and 14D. In this example, an interpolating position is determined using nine pixels at the edge of a subtitle pattern as a block. In each case, the shaded parts indicate the subtitle data, the dotted-line part indicates subtitles or background data, and the pixel at the position where the word "INTERPOLATION" is written indicates the interpolated data part.

The present invention is not limited to the above embodiment.

When the subtitles are enlarged, one line of subtitles occasionally fails to fit in the monitor screen as it is. To overcome this drawback, the present system is provided with a line feed function.

Figure 15:
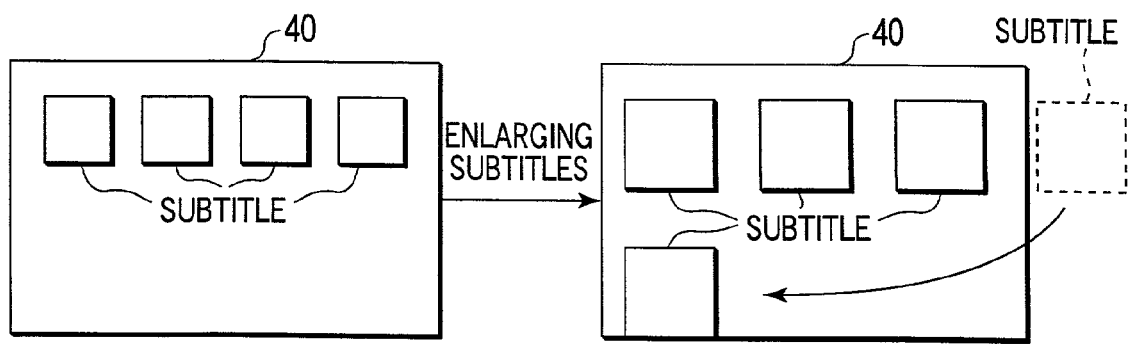
FIG. 15 is a diagram to help explain still another example of the operation of the apparatus related to the present invention.

FIG. 15 shows an example of enlarging the subtitles in the subtitle area with more length than width. When the subtitles fail to fit in the screen as a result of enlargement, the value x2 smaller than and closest to the horizontal size of the screen is calculated. Then, the screen size is subtracted from the horizontal data of the subtitles at the positions greater than x2, whereas y is added to the vertical data corresponding to x2 to shift the data one line. This makes it possible to fit all the subtitles corresponding to the screen into the screen.

Figure 16:
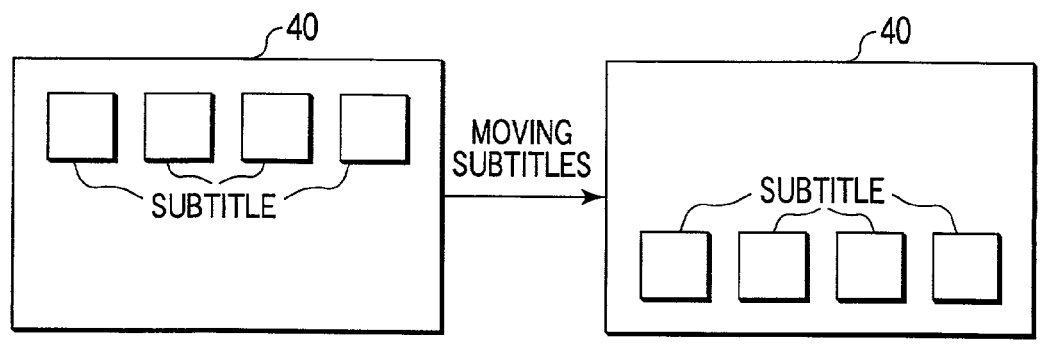
FIG. 16 is a diagram to help explain another example of the operation of the apparatus related to the present invention.

FIG. 16 shows an example of simply moving the subtitles with more length than width in the upper part of the screen downward.

Furthermore, the color of the subtitles can be changed. This is done by operating a color change key to change the color data included in the subtitle data.

While in the above embodiment, the explanation has been given on the assumption that the sub-pictures and main pictures reproduced from a DVD video can be processed, the present invention is not limited to this. For instance, the invention may be applied to various sub-picture processes of sub-pictures and caption data sent with broadcasting signals. In addition, while in the above embodiments, the smoothing function, video processing function, and video processing/sub-picture processing synchronizing function have been explained in the separate embodiments, they may be combined together in a single embodiment.

Still furthermore, while in the above embodiments, the DVD video reproducing apparatus has been explained, the reproducing apparatus may be provided with means for recording data on a recordable disk. Moreover, while explanation has been given, provided that the recording medium is a DVD video, an optical disk, the recording medium may be a hard disk acting as a magnetic recording/reproducing medium.

As has been described above, the present invention enables the user to process and set the display state of sub-picture signals arbitrarily on the reproducing apparatus side and obtain the display state of the sub-picture signals according to the user's taste.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reproducing apparatus with a sub-picture processing function, comprising:
    a main picture decoder for decoding compressed main picture data and outputting a main picture signal;
    a sub-picture decoder for decoding sub-picture data;
    sub-picture processing means for receiving the sub-picture signal decoded at said sub-picture decoder and changing the layout position and/or size of the sub-picture signal; and
    combining means for combining the processed sub-picture signal outputted from said sub-picture processing means with said main picture signal.

2. The reproducing apparatus with a sub-picture processing function according to claim 1, wherein said main picture information and sub-picture information are reproduced from a recording medium.

3. The reproducing apparatus with a sub-picture processing function according to claim 1, wherein said sub-picture processing means carries out a line feed process of subtitles serving as the sub-picture signal or a color change process.

4. The reproducing apparatus with a sub-picture processing function according to claim 1, wherein said sub-picture processing means is provided with the function of smoothing the edge of the subtitles in enlarging the subtitles serving as the sub-picture signal.

5. The reproducing apparatus with a sub-picture processing function according to claim 1, further comprising video processing means between said main picture decoder and combining means, the video processing means being provided with a video processing/sub-picture processing synchronizing function of causing said video processing means to enlarge a picture at the same magnifying power as that of the subtitle enlargement, when said sub-picture processing means enlarges the subtitles serving as the sub-picture signal.

6. A reproducing apparatus with a sub-picture processing function, comprising:
    a main picture decoder for decoding compressed main picture data and outputting a main picture signal;
    a sub-picture decoder for decoding sub-picture data;

sub-picture processing means for receiving the sub-picture signal decoded at said sub-picture decoder and changing the layout position and/or size of the sub-picture signal;

control means for supplying a control signal for enlarging or reducing said sub-picture signal to said sub-picture processing means; and combining means for combining the processed sub-picture signal outputted from said sub-picture processing means with said main picture signal.

7. The reproducing apparatus with a sub-picture processing function according to claim 6, wherein said control means further supplies a control signal for changing the layout position of said sub-picture signal with respect to said main picture signal.

8. The reproducing apparatus with a sub-picture processing function according to claim 6, wherein said control means further supplies a control signal for changing the display color of said sub-picture signal.

9. The reproducing apparatus with a sub-picture processing function according to claim 6, wherein said control means creates said control signal in response to the signal from a remote controller.

10. The reproducing apparatus with a sub-picture processing function according to claim 6, wherein said sub-picture data is extracted from a broadcasting signal.

11. The reproducing apparatus with a sub-picture processing function according to claim 6, wherein said sub-picture data is the data reproduced from an optical disk or a hard disk.

* * * * *